US012560980B2

(12) United States Patent
Lin et al.

(10) Patent No.: US 12,560,980 B2
(45) Date of Patent: Feb. 24, 2026

(54) SUPPORT STRUCTURE FOR FLEXIBLE DISPLAY

(71) Applicant: BOE Technology Group Co., Ltd., Beijing (CN)

(72) Inventors: Xinqi Lin, Beijing (CN); Hong Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 134 days.

(21) Appl. No.: 18/576,350

(22) PCT Filed: Mar. 31, 2023

(86) PCT No.: PCT/CN2023/085389
§ 371 (c)(1),
(2) Date: Jan. 3, 2024

(87) PCT Pub. No.: WO2024/197790
PCT Pub. Date: Oct. 3, 2024

(65) Prior Publication Data
US 2025/0093917 A1      Mar. 20, 2025

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .... G06F 1/1681; G06F 1/1652; G06F 1/1624; G09F 9/301; H04M 1/0268; H04M 1/0235
See application file for complete search history.

(56) References Cited

U.S. PATENT DOCUMENTS

| | | | | | |
|---|---|---|---|---|---|
| 2019/0387629 A1* | 12/2019 | Zhang | ................... | G02F 1/1336 |
| 2020/0314225 A1 | 10/2020 | Ahn | | |
| 2022/0078270 A1* | 3/2022 | Song | ................... | H04M 1/0235 |
| 2022/0117100 A1 | 4/2022 | Yoon et al. | | |
| 2022/0150337 A1* | 5/2022 | Lee | ....................... | G06F 1/1624 |

(Continued)

FOREIGN PATENT DOCUMENTS

| | | |
|---|---|---|
| CN | 111754863 A | 10/2020 |
| CN | 113593411 A | 11/2021 |

(Continued)

*Primary Examiner* — Allen L Parker
*Assistant Examiner* — Peter Krim
(74) *Attorney, Agent, or Firm* — IPro, PLLC

(57) ABSTRACT

Provided is a display device, including a first housing, at least one second housing, a flexible display panel, and a plurality of load-bearing strips. The second housing includes a mount housing, two stoppers, and at least one support bar. The flexible display panel includes a planar display portion, fixed to the first housing, and a curved display portion. The curved display portion includes a first portion and a second portion wrapped on a side, going away from the first housing, of the mount housing. Two ends of the load-bearing strip are respectively slidably connected to the two stoppers. The load-bearing strips are fixedly connected to a backside of the curved display portion. A lengthwise direction of the load-bearing strip is intersected with a lengthwise direction of the support bar. A surface, going away from the curved display portion, of the load-bearing strip is in contact with the support bar.

12 Claims, 14 Drawing Sheets

(56)         References Cited

U.S. PATENT DOCUMENTS

| | | | |
|---|---|---|---|
| 2022/0368787 A1* | 11/2022 | Choi | G09F 9/30 |
| 2023/0130358 A1* | 4/2023 | Choi | G09F 9/30 |
| | | | 361/679.01 |

FOREIGN PATENT DOCUMENTS

| | | | |
|---|---|---|---|
| CN | 114363437 | A | 4/2022 |
| CN | 114694491 | A | 7/2022 |
| CN | 115410481 | A | 11/2022 |
| CN | 115424525 | A | 12/2022 |
| CN | 115499528 | A | 12/2022 |
| CN | 115527449 | A | 12/2022 |
| CN | 115662293 | A | 1/2023 |

* cited by examiner

SUPPORT STRUCTURE FOR FLEXIBLE DISPLAY

CROSS-REFERENCE TO RELATED APPLICATION

The present disclosure is a U.S. national stage of international application No. PCT/CN2023/085389, filed on Mar. 31, 2023, the content of which is herein incorporated by reference in its entirety.

TECHNICAL FIELD

The present disclosure relates to the field of display technologies, and in particular, relates to a display device.

BACKGROUND

At present, display devices use flexible display panels as display screens. The flexible display panels have the advantages of being deformable, bendable, and more flexible over conventional display panels.

SUMMARY

Some embodiments of the present disclosure provide a display device. The technical solutions are as follows.

According to some embodiments of the present disclosure, a display device is provided. The display device includes:

a first housing and at least one second housing, wherein the second housing is slidably connected to the first housing, and the second housing includes a mount housing, two stoppers fixedly connected to two ends of the mount housing, and at least one support bar between the two stoppers, one end of the support bar being fixedly connected to the mount housing;

a flexible display panel, including a planar display portion and a curved display portion, wherein the planar display portion is fixed to the first housing, and the curved display portion includes a first portion parallel to the planar display portion and a second portion between the first portion and the planar display portion, the second portion being wrapped on a side, going away from the first housing, of the mount housing; and a plurality of load-bearing strips arranged in an array between the two stoppers, wherein two ends of each of the load-bearing strips are respectively slidably connected to the two stoppers, each of the load-bearing strips is fixedly connected to a back side of the curved display portion, a lengthwise direction of each of the load-bearing strips is intersected with a lengthwise direction of the support bar, and a surface, going away from the curved display portion, of the load-bearing strip is in contact with the support bar.

In some embodiments, a slide channel is defined in second housing, wherein the slide channel includes a first slide channel and a second slide channel that are opposite to each other on the support bar, and a transition slide channel disposed on the side, going away from the first housing, of the mount housing, two ends of the transition slide channel being respectively communicated with the first slide channel and the second slide channel; and the surface, going away from the curved display portion, of the load-bearing strip includes a slider, wherein at least a portion of the slider is within the slide channel.

In some embodiments, a stopper slot is defined in the second housing, wherein the stopper slot includes a first stopper slot communicated with the first slide channel, a second stopper slot communicated with the second slide channel, and a transition stopper slot communicated with the transition slide channel, the first stopper slot and the second stopper slot both being between the first slide channel and the second slide channel, and the transition stopper slot being closer to the first housing relative to the transition slide channel; and the surface, going away from the curved display portion, of the load-bearing strip further includes a stopper protrusion fixedly connected to the slider, wherein at least a portion of the stopper protrusion is within the stopper slot.

In some embodiments, the stopper slot includes a first slot body communicated with the slide channel, and two second slot bodies disposed on both sides of the first slot body;

wherein the number of the stopper protrusions fixedly connected to the slider is two, a portion of the slider is within the first slot body after passing through the slide channel, and the two stopper protrusions are respectively within the two second slot bodies.

In some embodiments, the mount housing includes at least two sub-housings successively arranged, and a lock assembly between adjacent two of the sub-housings, the lock assembly being connected to each of the adjacent two sub-housings; and the support bar is between adjacent two of the sub-housings, and the support bar includes two sub-bars, one end of each of the two sub-bars being fixedly connected to one of the adjacent two sub-housings;

wherein a portion of the slide channel and a portion of the stopper slot are between the two sub-bars, and another portion of the slide channel and another portion of the stopper slot are between the adjacent two sub-housings.

In some embodiments, the lock assembly includes a stop block fixedly connected to a side, proximal to the second sub-housing, of the first sub-housing, a location post fixedly connected to a side, going away from the first sub-housing, of the stop block, and a location hole disposed on a side, proximal to the first sub-housing, the second sub-housing; wherein after the location post is within the location hole, the first sub-housing is connected to the second sub-housing, and the side, proximal to the first sub-housing, of the second sub-housing abuts the stop block; and the first sub-housing and the second sub-housing are respectively adjacent two sub-housings of the at least two sub-housings.

In some embodiments, in adjacent two of the sub-housings, a first recess is defined in a side, adjacent to the other sub-housing, of one of the two sub-housings, the stop block is fixedly connected to a bottom surface of the first recess in the first sub-housing, and the location hole is disposed on a bottom surface of the first recess in the second sub-housing; and a second recess communicated with the first recess is defined in the sub-bar.

In some embodiments, the mount housing includes a mount housing body and at least two fix members, wherein the mount housing body and the support bar are of a one-piece structure, adjacent two fix members of the at least two fix members correspond to one of the support bars, and the adjacent two fix members are connected to a side, going away from the corresponding support bar, of the mount housing body;

wherein the transition slide channel and the transition stopper slot are both between the adjacent two fix members.

In some embodiments, a location slot is defined in a side, proximal to the mount housing body, of the fix member, an avoidance notch is defined in the mount housing body, and the fix member is socketed on the mount housing body at the avoidance notch through the location slot.

In some embodiments, the flexible display panel further includes a non-display portion disposed on a side, going away from the planar display portion, of the curved display portion; and the display device further includes a fix plate, wherein the fix plate is fixedly connected to a back side of the non-display portion, two ends of the fix plate are respectively slidably connected to the two stoppers, and a surface, going away from the non-display portion, of the fix plate includes an auxiliary slider, at least a portion of the auxiliary slider being within the slide channel.

In some embodiments, the display device further includes a recovery plate fixedly connected to a side, going away from the load-bearing strip, of the fix plate, a circuit board fixed to the recovery plate, and a chip on flex (COF) configured to connect the circuit board to the non-display portion.

In some embodiments, an auxiliary slide channel is defined in a side, facing towards the load-bearing strip, of the stopper, and an end portion of the load-bearing strip is within the auxiliary slide channel.

In some embodiments, the side, going away from the first housing, of the mount housing is in a shape of a circular arc.

In some embodiments, the display device further includes a drive assembly, wherein the drive assembly is connected to the first housing and the second housing, and the drive assembly is configured to drive the second housing to slide relative to the first housing.

In some embodiments, the number of the second housings in the display device is one, and after the flexible display panel is stretched, the second housing is disposed on any one of the opposite two sides of the first housing; or the number of the second housings in the display device is two, and after the flexible display panel is stretched, the two second housings are respectively disposed on the opposite two sides of the first housing.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

4

Figure 5:
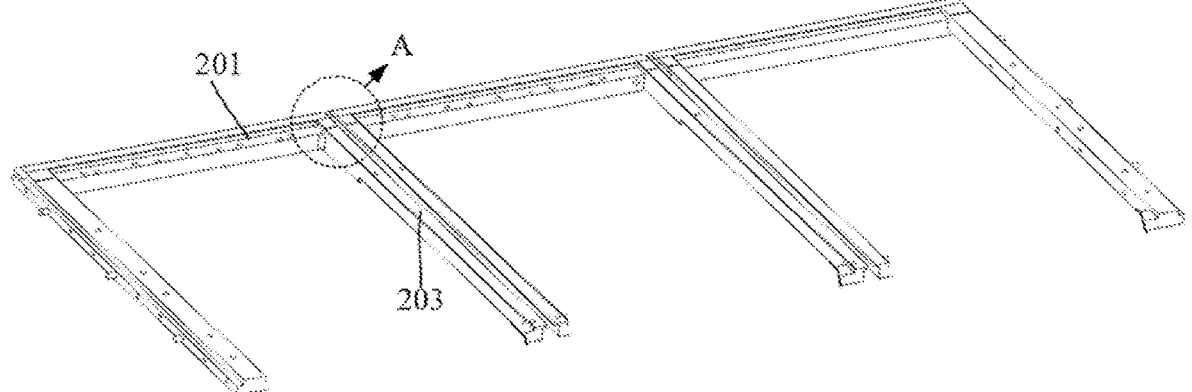
Figure 6:
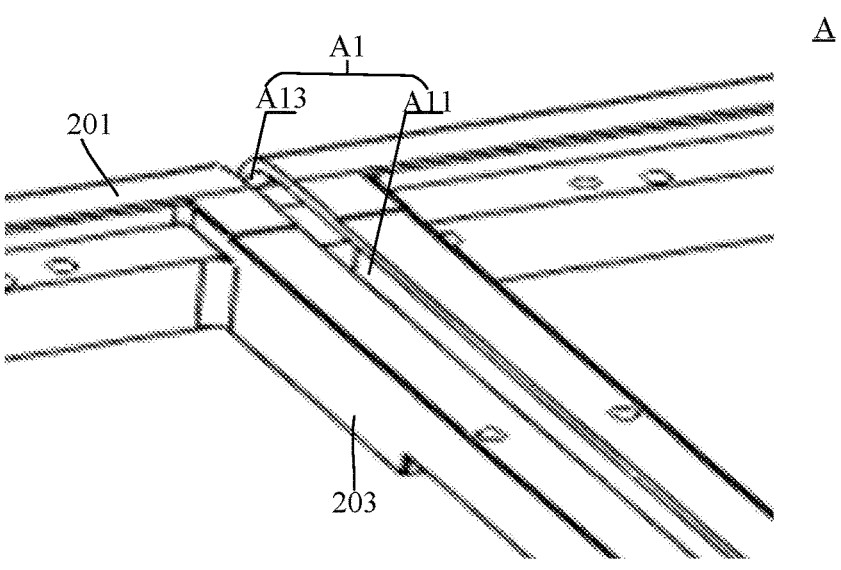
Figure 7:
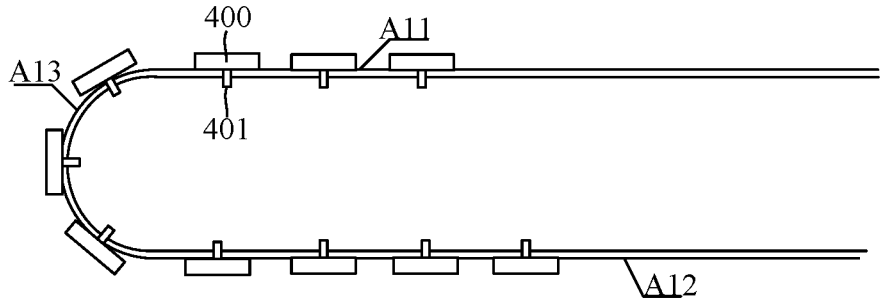
Figure 8:
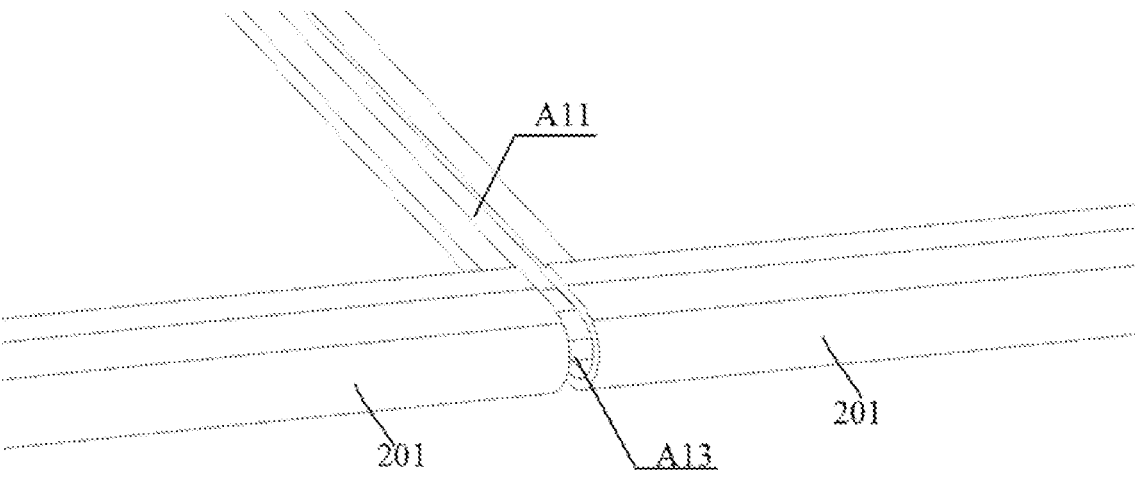
Figure 9:
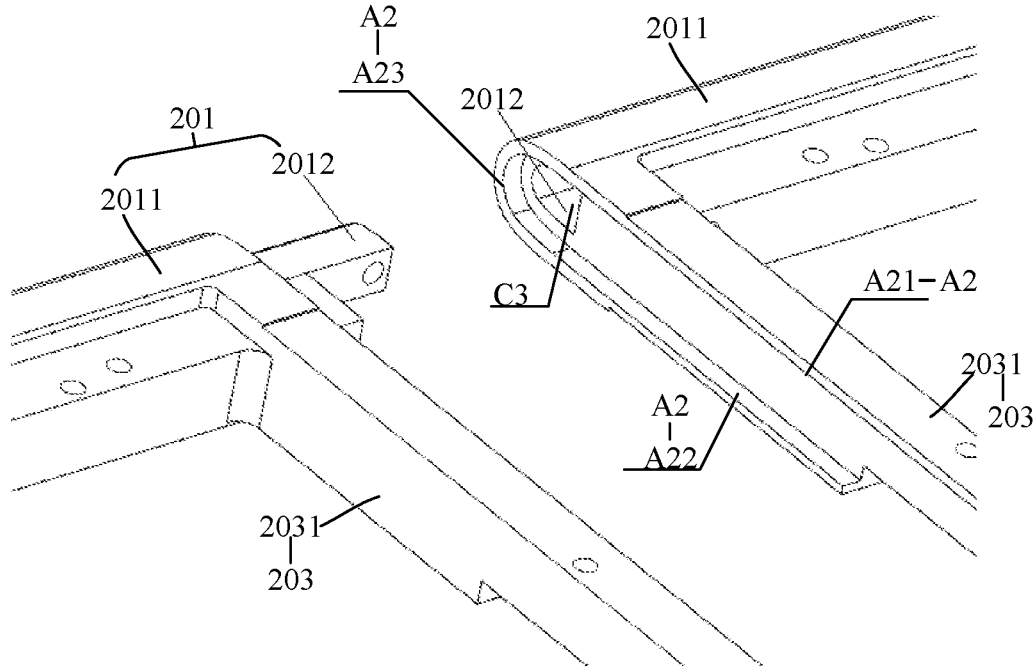
Figure 10:
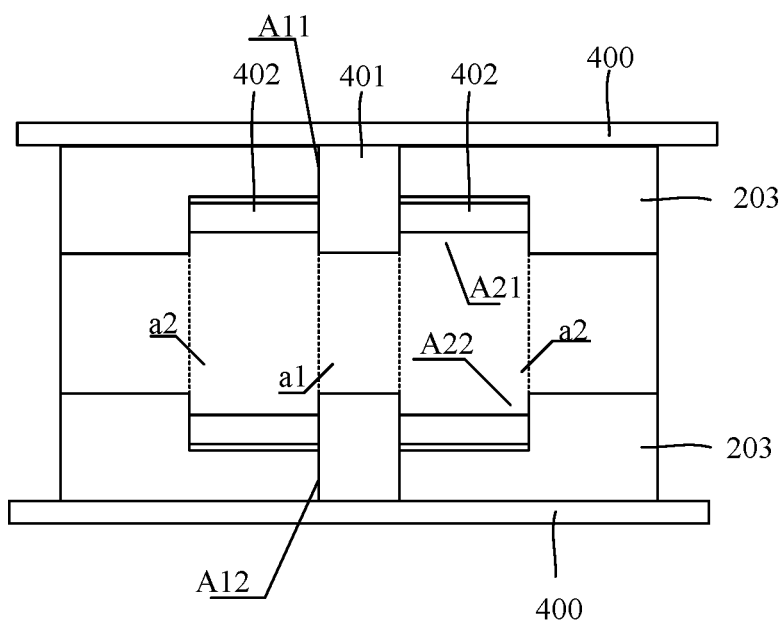
Figure 11:
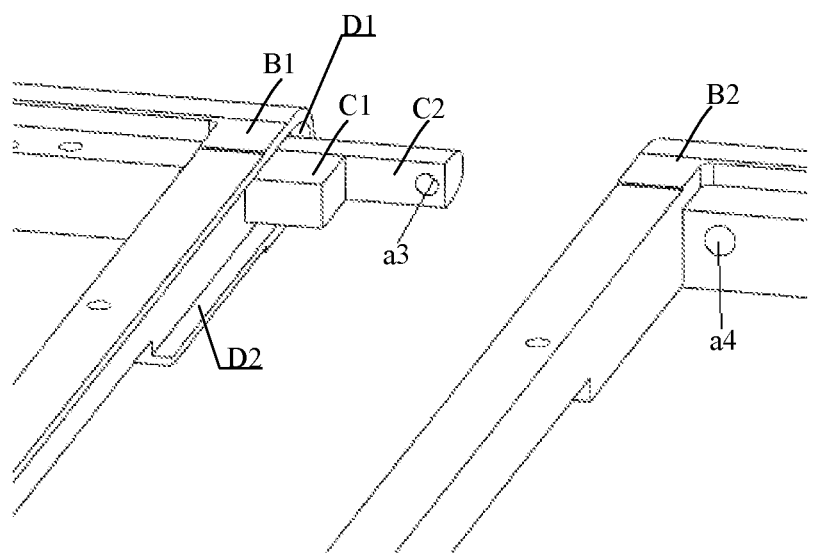
Figure 12:
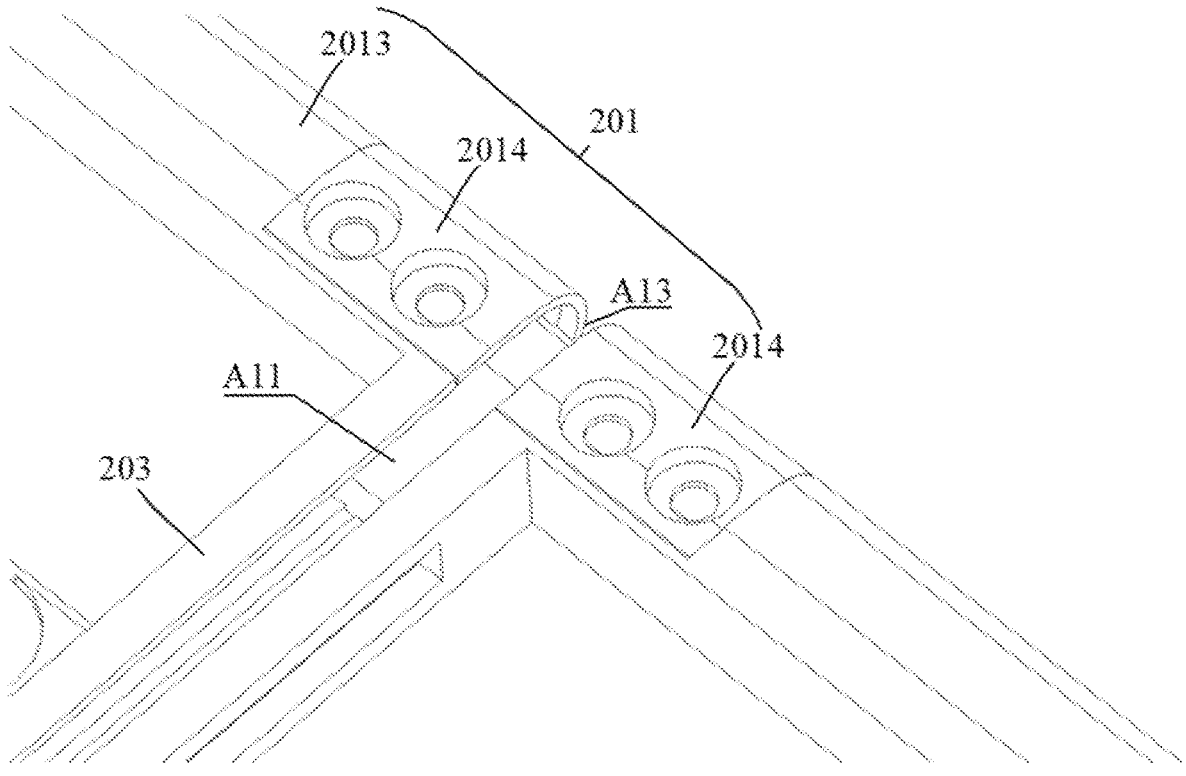
Figure 13:
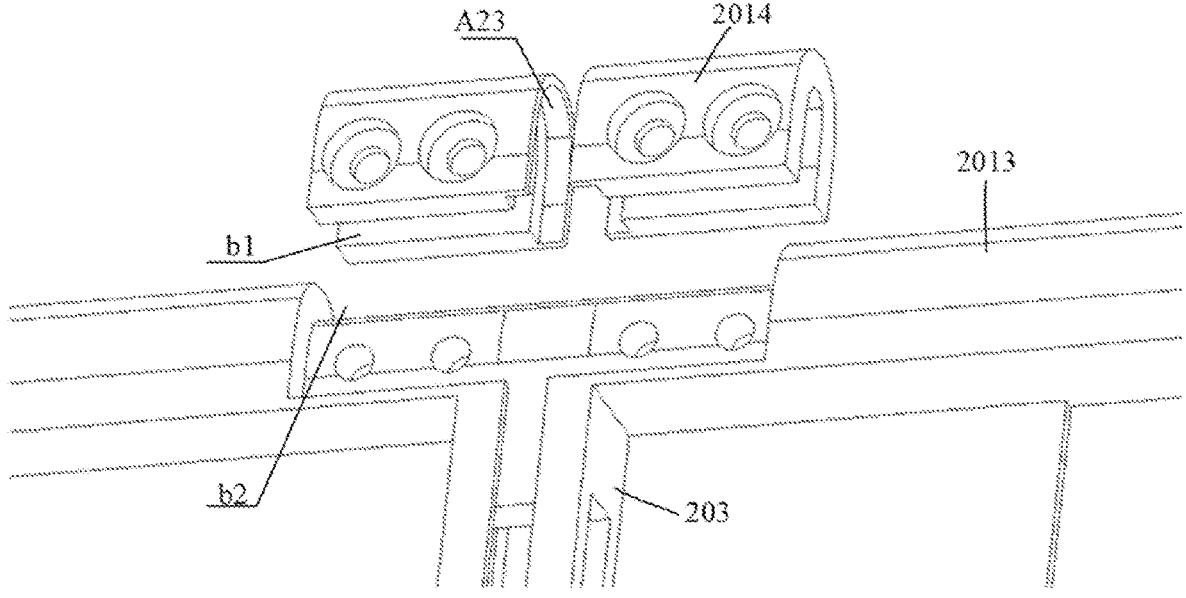
Figure 14:
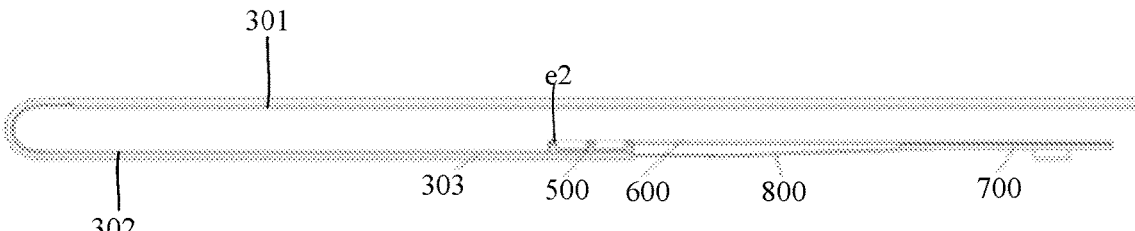
Figure 15:
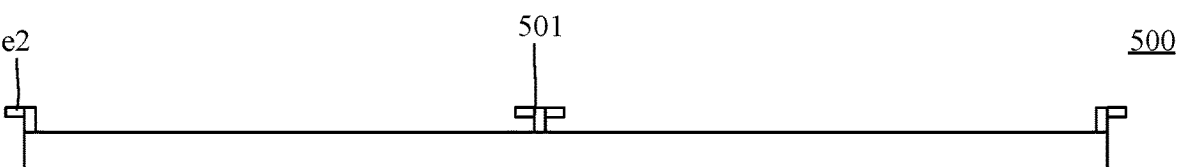
Figure 16:
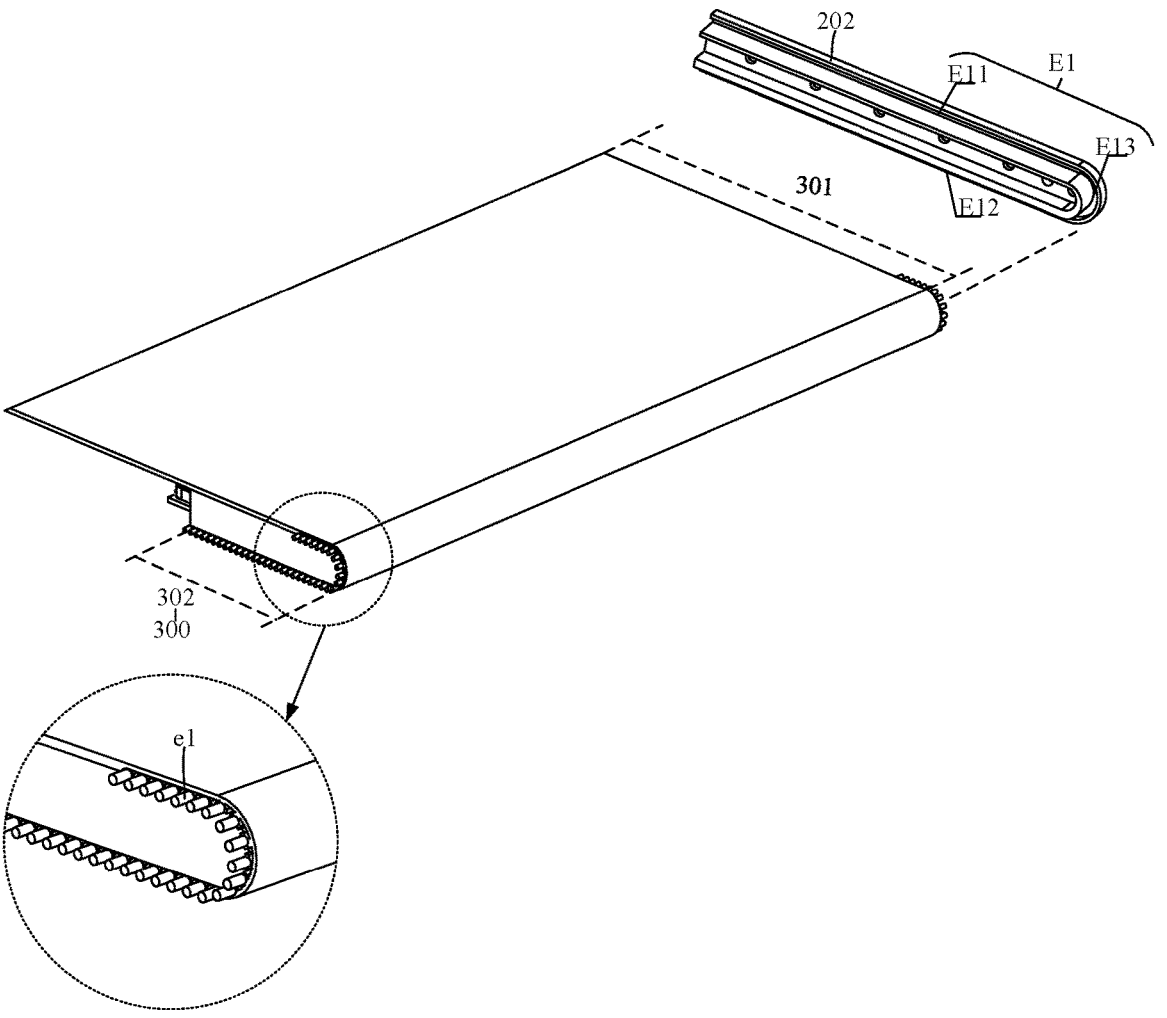
Figure 17:
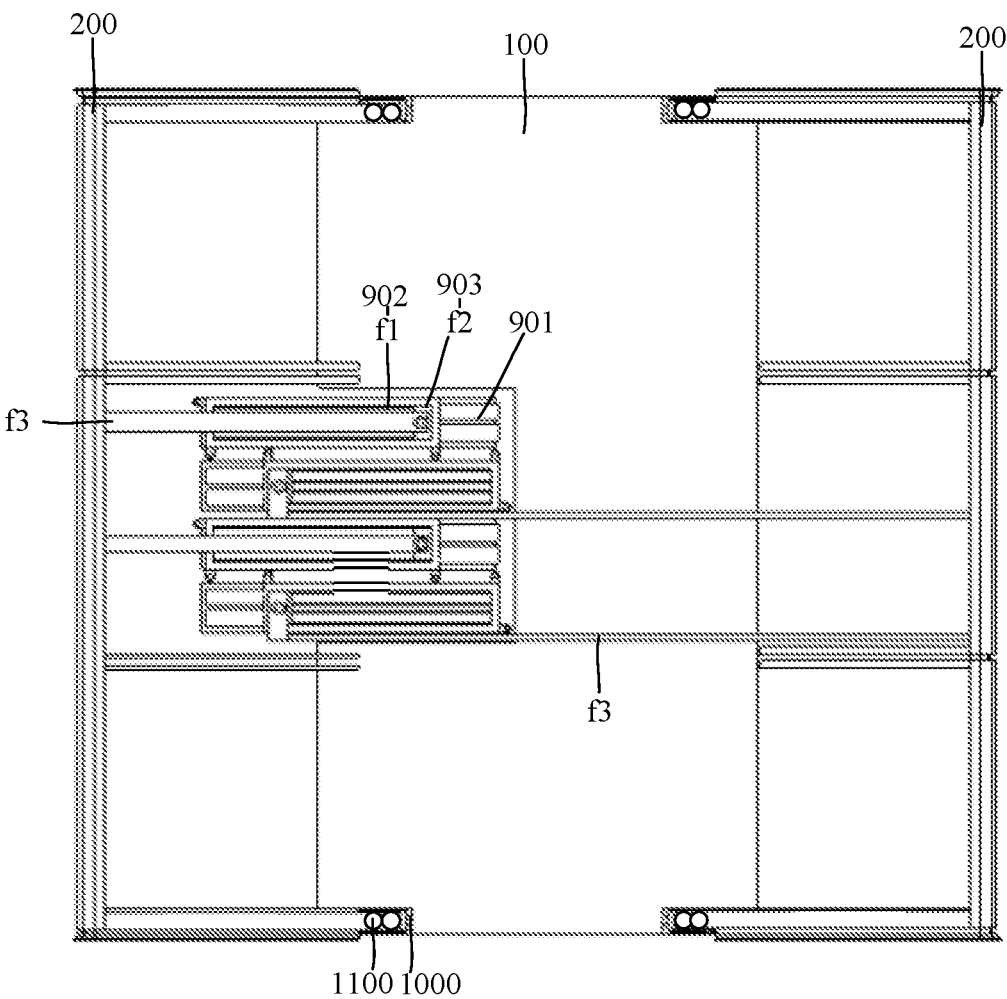
Figure 18:
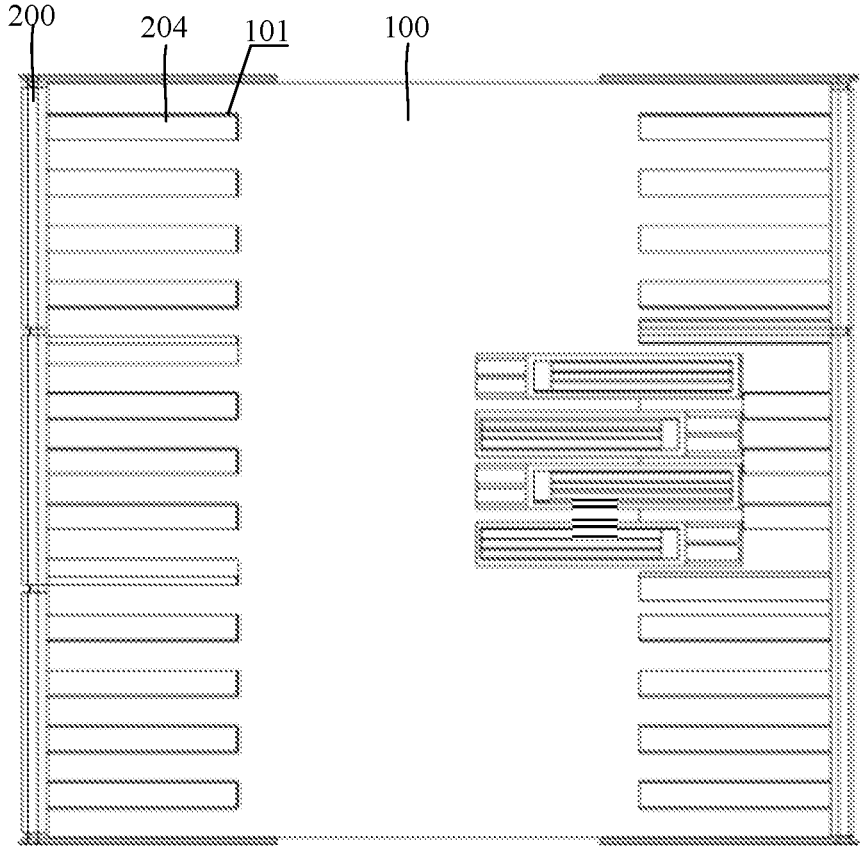
Figure 19:
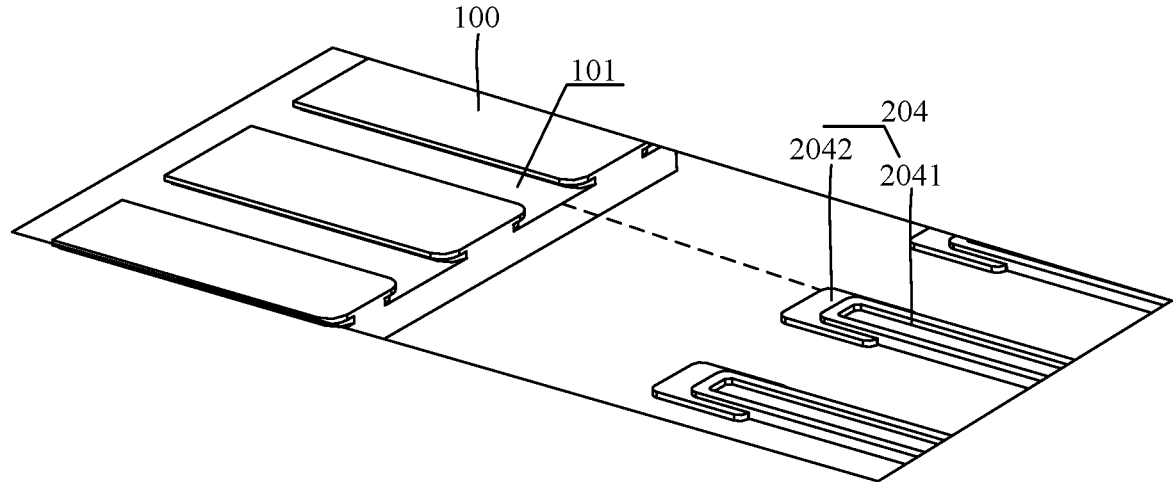
Figure 20:
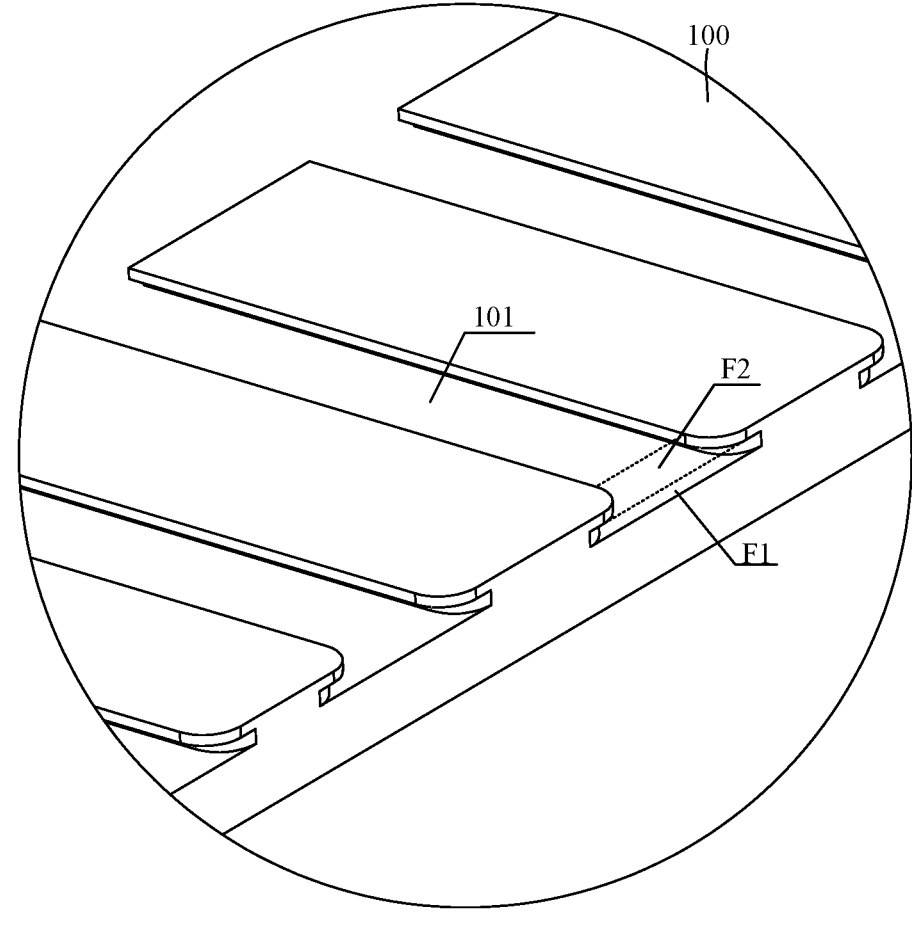

FIG. 5 is a schematic view of a partial structure of a display device according to some embodiments of the present disclosure;

FIG. 6 is a schematic partially enlarged view of FIG. 5 at a position A;

FIG. 7 is a schematic view of a distribution of slide channels in the display device illustrated in FIG. 5;

FIG. 8 is a rear view of the display device illustrated in FIG. 6;

FIG. 9 is a schematic exploded view of a partial structure of the display device illustrated in FIG. 6;

FIG. 10 is a schematic view of a connection between a stopper slot and a load-bearing strip illustrated in FIG. 9;

FIG. 11 is a schematic exploded view of a lock assembly and a sub-housing according to some embodiments of the present disclosure;

FIG. 12 is a schematic view of a partial structure of yet another display device according to some embodiments of the present disclosure;

FIG. 13 is a schematic exploded view of a partial structure of the display device illustrated in FIG. 12;

FIG. 14 is a schematic view of a partial structure of yet still another display device according to some embodiments of the present disclosure;

FIG. 15 is a schematic structural view of a fix plate according to some embodiments of the present disclosure;

FIG. 16 is a schematic exploded view of a load-bearing strip, a flexible display panel, and a stopper according to some embodiments of the present disclosure;

FIG. 17 is a schematic view of a partial structure of a display device according to other embodiments of the present disclosure;

FIG. 18 is a schematic structural view of another display device according to other embodiments of the present disclosure;

FIG. 19 is a schematic exploded view of a guiding bar and a guiding slide channel in the display device illustrated in FIG. 18; and FIG. 20 is a schematic structural view of a dovetail slot according to some embodiments of the present disclosure.

Definite embodiments of the present disposed, illustrated by the accompanying drawings described above, will be described in greater detail hereinafter. These accompanying drawings and textual descriptions are not intended to constitute any limitation to the scope of the present application in any form, but rather to illustrate the concepts of the present application for those skilled in the art by reference to particular embodiments.

DETAILED DESCRIPTION

The present disclosure is described in further detail with reference to the accompanying drawings, to clearly present the objects, technical solutions, and advantages of the present disclosure.

The flexible display panel in a display device is capable of being stretched or rolled up under driving of a housing, such that the display device has a stretched state and a rolled-up state, and thus a size of a display surface of the display device is adjusted.

However, in the case that a size of the flexible display panel in a direction perpendicular to its sliding direction is large, after the flexible display panel is stretched, the flatness of some regions in the flexible display panel is poor, which leads to a poorer display effect of the display device.

Figure 1:
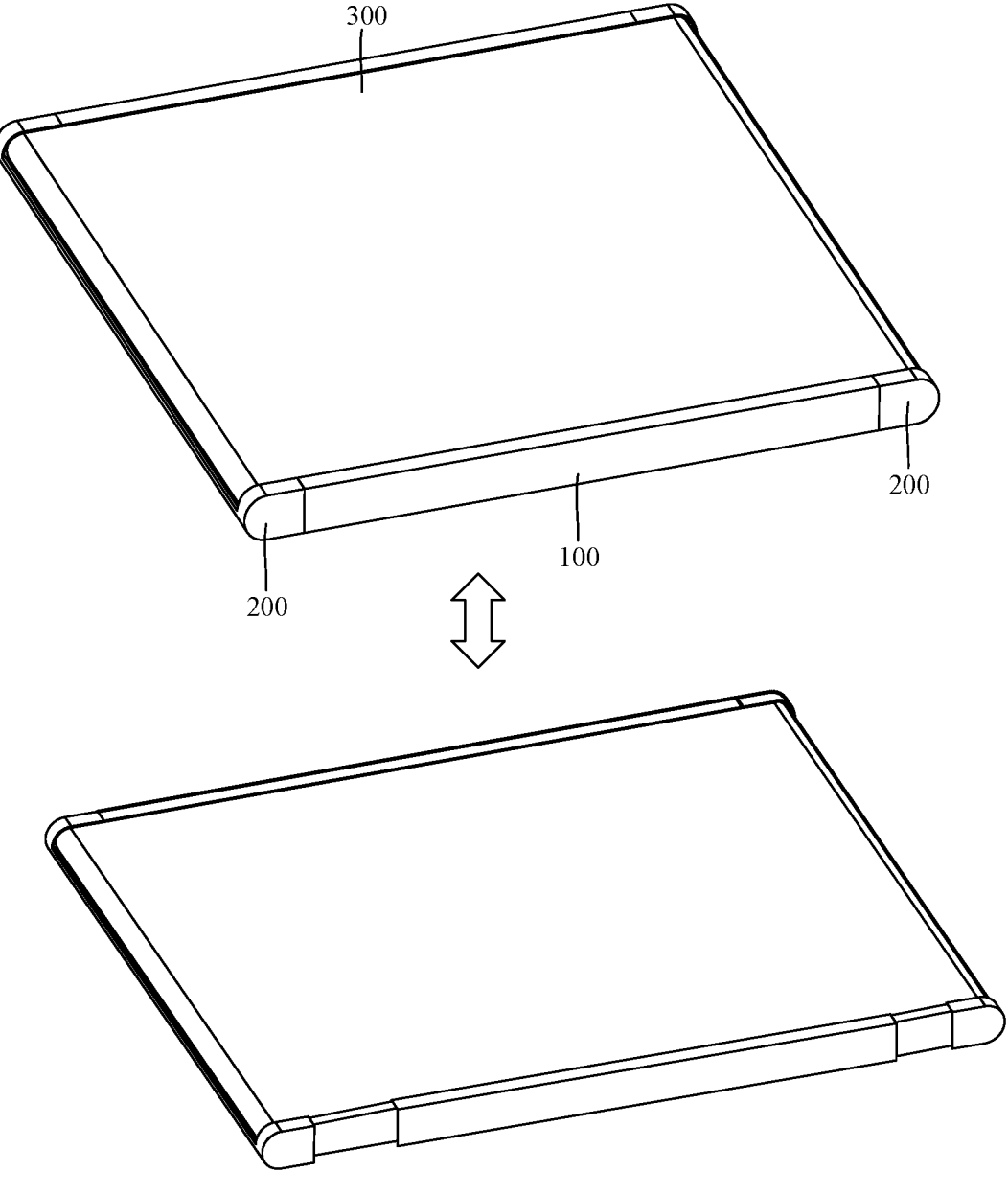
FIG. 1 is a schematic view of an effect of stretching and rolling-up a flexible display panel in a display device according to some embodiments of the present disclosure.
Figure 2:
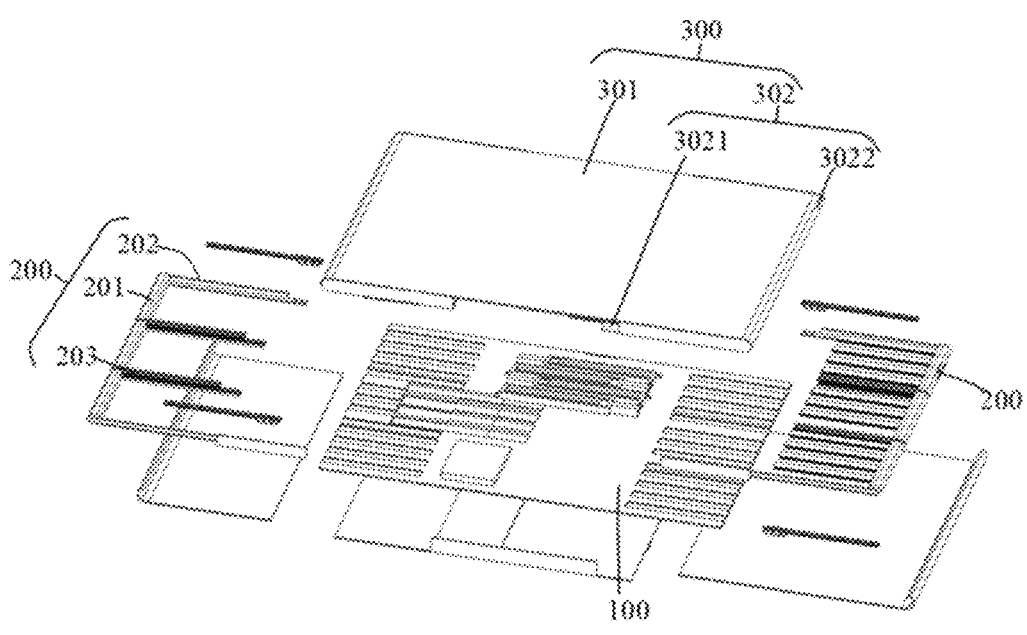
FIG. 2 is a schematic exploded view of a partial structure of the display device illustrated in FIG. 1.

FIG. 1 is a schematic view of an effect of stretching and rolling-up a flexible display panel in a display device according to some embodiments of the present disclosure, and FIG. 2 is a schematic exploded view of a partial structure of the display device illustrated in FIG. 1. Referring to FIG. 1 and FIG. 2, the display device is a smartphone, a tablet computer, a television, a monitor, a laptop computer, a digital photo frame, a navigator, and any other product or component having a display function and a sliding-rolling function. The display device includes a first housing 100, at least one second housing 200, a flexible display panel 300, and a plurality of load-bearing strips 400.

The second housing 200 in the display device is slidably connected to the first housing 100. The second housing 200 includes a mount housing 201, two stoppers 202 fixedly connected to two ends of the mount housing 201, and at least one support bar 203 between the two stoppers 20. One end of the support bar 203 is fixedly connected to the mount housing 201. In some embodiments, a lengthwise direction of the support bar 203 is parallel to a sliding direction of the second housing 200 with respect to the first housing 100.

The flexible display panel 300 in the display device includes a planar display portion 301 and a curved display portion 302. The planar display portion is fixed to the first housing 100. The curved display portion 302 in the flexible display panel 300 includes a first portion 3021 arranged in parallel with the planar display portion 301, and a second portion 3022 between the first portion 3021 and the planar display portion 301. The second portion 3022 in the curved display portion 302 is wrapped on a side, going away from the first housing 100, of the mount housing 201 in the second housing 200.

Figure 3:
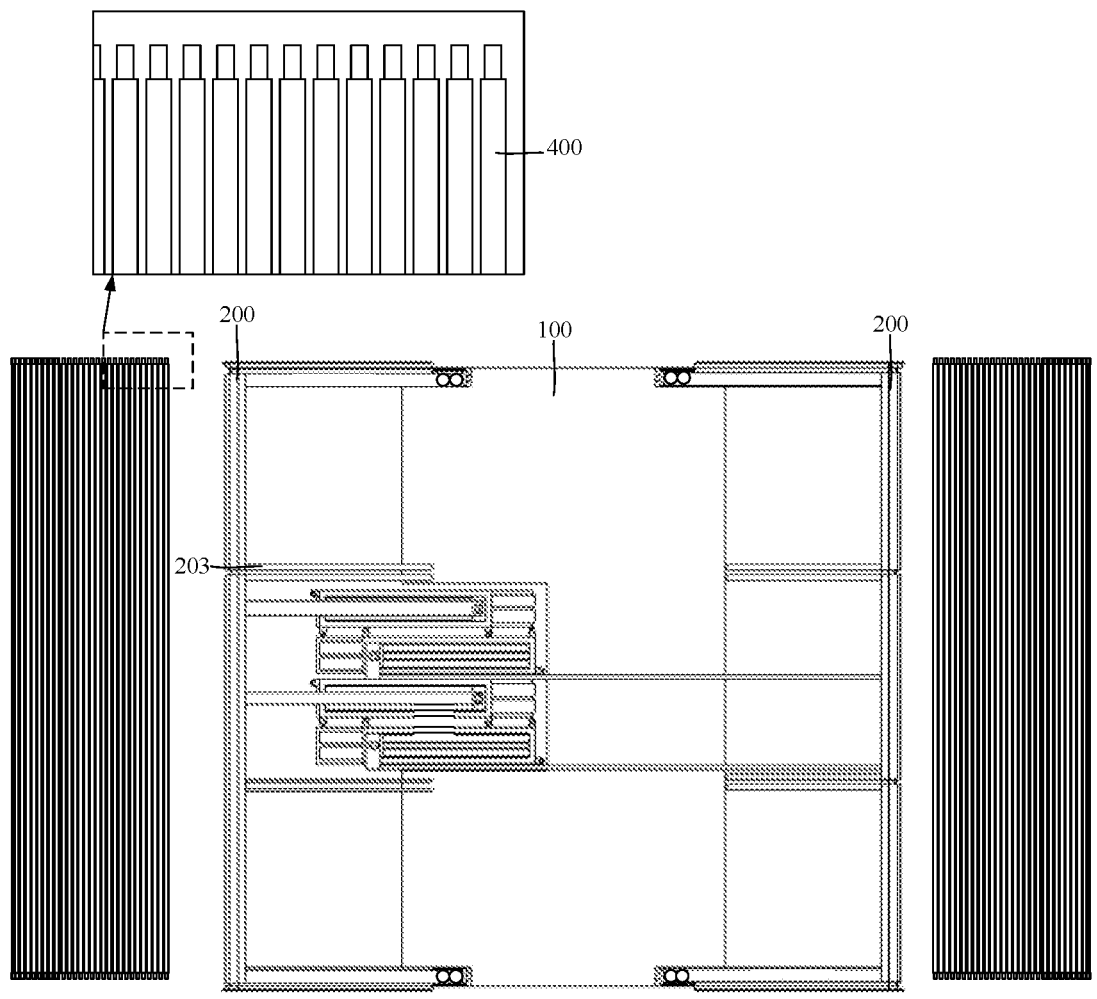
FIG. 3 is a schematic exploded view of a partial structure of a display device according to some embodiments of the present disclosure.

FIG. 3 is a schematic exploded view of a partial structure of a display device according to some embodiments of the present disclosure. Referring to FIG. 3, a plurality of load-bearing strips 400 in the display device are arranged in arrays between two stoppers 202 in the second housing 200, and two ends of the load-bearing strip 400 are respectively slidably connected to the two stoppers 202 (e.g., two ends of each of the load-bearing strips are slidably connected to the two stoppers). The plurality of load-bearing strips 400 are fixedly connected to a back side of the curved display portion 302 in the flexible display panel 300, and a lengthwise direction of the load-bearing strip 400 is intersected with a lengthwise direction of the support bar 203 (e.g., the lengthwise direction of the load-bearing strip is perpendicular to the lengthwise direction of the support bar). A surface, going away from the curved display portion 302, of the load-bearing strip 400 is in contact with the support bar 203. The flexible display panel 300 typically has a display surface and a non-display surface opposite to each other. For ease of subsequent description, a front surface of the flexible display panel is defined as a surface on which the display surface is located, and a back side of the flexible display panel is a surface on which the non-display surface is located.

In some embodiments of the present disclosure, in the case that the second housing 200 in the display device slides along a direction away from the first housing 100, the second housing 200 is able to drive the curved display portion 302 in the flexible display panel 300 to slide out of the second housing 200, and such that a display surface of the planar display portion 301 in the flexible display panel 300 is in the same plane as a large portion of a display surface of the curved display portion 302 (i.e., a size of a region of the flexible display panel for displaying images increases) for displaying images. In the case that the second housing 200 in the display device slides along a direction facing towards the first housing 100, the second housing 200 is able to drive the curved display portion 302 in the flexible display panel 300 to slide into the second housing 200, such that the size of the region of the flexible display panel 300 for displaying images decreases, and thus the display device is more portable. The curved display portion 302 in the flexible display panel 300 needs to be slid and rolled, and the flexible display panel 300 needs to be flexible. Therefore, the plurality of load-bearing strips 400 are arranged on the back side of the curved display portion 302 in the flexible display panel 300 (the plurality of load-bearing strips are arranged in arrays along the sliding-rolling direction of the curved display portion), the two ends of each of the load-bearing strips 400 are respectively slidably connected to the two stoppers 202 in the second housing 200, and the surfaces, going away from the curved display portion 302, of the load-bearing strips 400 are in contact with the support bars 203 between the two stoppers 202 in the second housing 200. In this way, the flexible display panel 300 is effectively supported by the plurality of load-bearing strips 400, and the plurality of load-bearing strips 400 are supported by the support bars 203. In other words, the degree of freedom of the flexible display panel 300 in a direction perpendicular to the display surface of the display panel is limited by the cooperation of the load-bearing strips 400 with the stoppers 202 and the support bars 203 in the second housing 200, such that the probability of the undesirable phenomenon of unevenness occurring to the overall region of the flexible display panel 300 is effectively reduced. That is, the overall flatness of the flexible display panel 300 is good (after the flexible display panel is stretched, the overall flatness of the flexible display panel is also ensured to be good through the supporting effect of the support bars on the plurality of load-bearing strips), such that the display effect of the display device is good. In addition, in some practices, an additional tensioning mechanism is typically required to be provided within a cavity formed between the first housing and the second housing of the display device for tensioning the flexible display panel. However, in the present disclosure, by affixing the plurality of load-bearing strips to the back side of the flexible display panel, the tensioning of the flexible display panel is realized by the cooperation between the load-bearing strips and the second housing. In this way, the space of the cavity in the display device is effectively saved, which facilitates the miniaturized design of the display device.

It should be noted that the embodiments of the present disclosure give the schematic description using a scenario where the first housing is a fix housing in the sliding-rolling display device and the second housing is a movable housing in the sliding-rolling display device as an example.

In summary, some embodiments of the present disclosure provide a display device. the display device includes the first housing, at least one second housing, the flexible display panel, and the plurality of load-bearing strips. The plurality of load-bearing strips are arranged on the back side of the curved display portion in the flexible display panel (the plurality of load-bearing strips are arranged in arrays along the sliding-rolling direction of the curved display portion), and two ends of each of the load-bearing strips are respectively slidably connected to the two stoppers in the second housing, and the surfaces, going away from the curved display portion, of the load-bearing strips are in contact with the support bars between the two stoppers in the second housing. In this way, the flexible display panel is effectively supported by the plurality of load-bearing strips, and the plurality of load-bearing strips are supported by the support bars. In other words, the degree of freedom of the flexible display panel in the direction perpendicular to the display surface of the display panel is limited by the cooperation of the load-bearing strips with the stoppers and the support bars in the second housing, such that the probability of the undesirable phenomenon of unevenness occurring to the overall region of the flexible display panel is effectively reduced. That is, the overall flatness of the flexible display panel is good (after the flexible display panel is stretched, the overall flatness of the flexible display panel is also ensured to be good through the supporting effect of the support bars on the plurality of load-bearing strips), such that the display effect of the display device is good.

Figure 4:
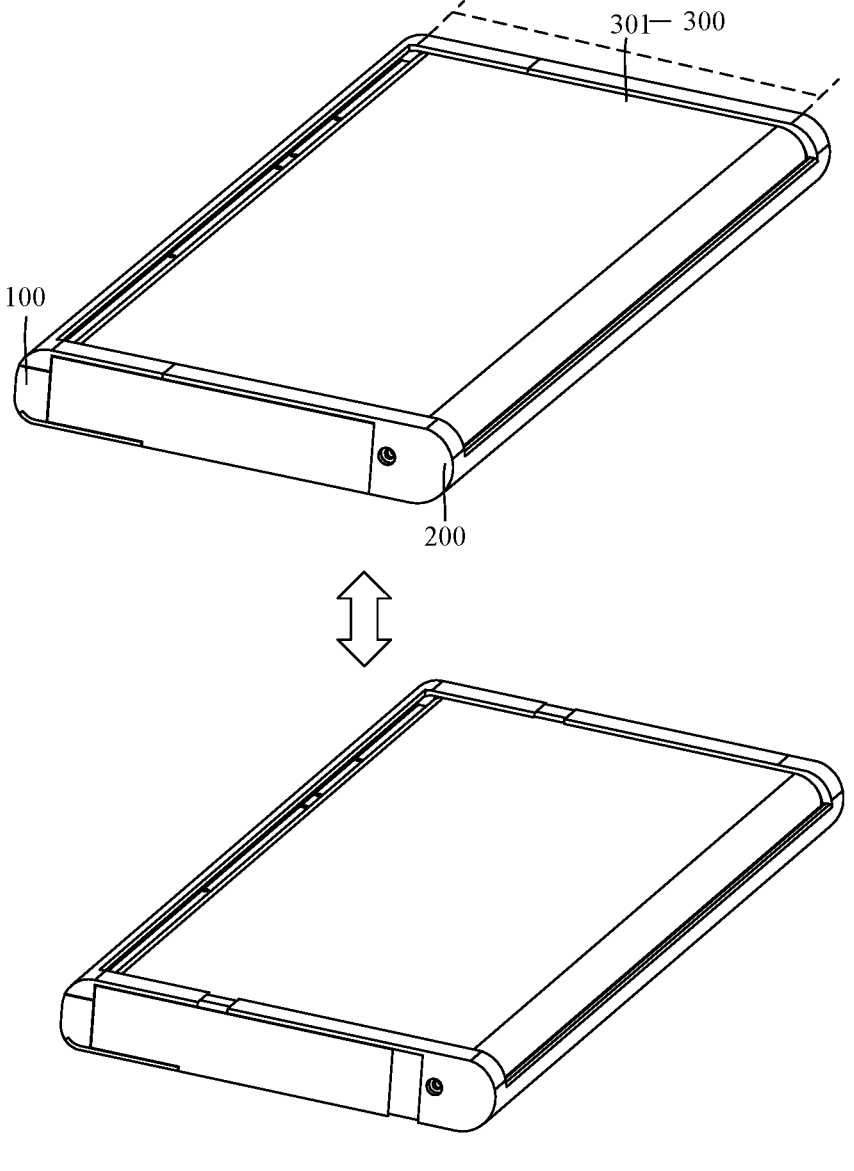
FIG. 4 is a schematic view of an effect of stretching and rolling-up a flexible display panel in another display device according to some embodiments of the present disclosure.

In some embodiments of the present disclosure, as illustrated in FIG. 1 and FIG. 2, two second housings 200 are provided in the display device. After the flexible display panel 300 is stretched, the two second housings 200 are disposed on both sides of the first housing 100 opposite to each other, and the two second housings 200 are both slidably connected to the first housing 100. FIG. 4 is a schematic view of an effect of stretching and rolling-up a flexible display panel in another display device according to some embodiments of the present disclosure. Referring to FIG. 4, one second housing 200 is provided in the display device. After the flexible display panel 300 is stretched, the second housing 200 is disposed on any of the two sides of the first housing 100 opposite to each other. As illustrated in FIG. 4, the second housing 200 is disposed on the right side of the first housing 100 and is slidably connected to the first housing 100. It should be noted that for ease of description, the following embodiments are all schematically illustrated using a scenario where one second housing 200 is slidably connected to the first housing 100 as an example.

In some embodiments, as illustrated in FIG. 2, the side, going away from the first housing 100, of the mount housing 201 in the second housing 200 is in a shape of a circular arc. In this case, by arranging the side, going away from the first housing 100, of the mount housing 201 in the second housing 200 to be in the shape of a circular arc, after the second portion 3022 in the curved display portion 302 is wrapped on the side, going away from the first housing 100, of the mount housing 201, a smooth transition of the curved display portion 302 in the flexible display panel 300 is formed by the side, going away from the first housing 100, of the mount housing 201, such that the curved display portion 302 achieves a stable sliding connection with the side, going away from the first housing 100, of the mount housing 201. In the actual processing, the smooth connection between the curved display portion 302 in the flexible display panel 300 and the side, going away from the first housing 100, of the mount housing 201 is achieved by reducing the roughness of the side, going away from the first housing 100, of the mount housing 201.

In some embodiments, there are a plurality of optional implementations for the number of support bars 203 in the second housing 200, and the present disclosure gives the schematic description using the following two optional examples.

In a first optional example, the at least one support bar 203 in the second housing 200 includes one support bar, and the one support bar 203 is disposed in a central region between the two stoppers 202. In the case that the number of support bars 203 is one and the one support bar 203 is disposed in the center region between the two stoppers 202, the plurality of load-bearing strips 400 and the curved display portion 302 in the flexible display panel 300 connected to the plurality of load-bearing strips 400 are stably supported by the supporting effect of the two stoppers 202 and the support bar 203.

In a second optional example, as illustrated in FIG. 2, the at least one support bar 203 in the second housing 200 includes a plurality of support bars, and the plurality of support bars 203 are equally spaced in the region between the two stoppers 202. In the case that the plurality of support bars 203 are provided in the second housing 200 and the plurality of support bars 203 are equally spaced apart, the plurality of support bars 203 equally spaced apart apply a uniform supporting force on the plurality of load-bearing strips 400. In this way, after the flexible display panel 300 is stretched, the flexible display panel 300 is subjected to a uniform supporting force, and thus the flatness of the flexible display panel 300 is ensured to be good.

FIG. 5 is a schematic view of a partial structure of a display device according to some embodiments of the present disclosure. FIG. 6 is a schematic partially enlarged view of FIG. 5 at a position A. FIG. 7 is a schematic view of a distribution of slide channels in the display device illustrated in FIG. 5. FIG. 8 is a rear view of the display device illustrated in FIG. 6. In some embodiments, referring to FIG. 5, FIG. 6, FIG. 7, and FIG. 8, the second housing 200 in the display device has a slide channel A1. The slide channel A1 includes a first slide channel A11, a second slide channel A12, and a transition slide channel A13. The first slide channel A11 and the second slide channel A12 are disposed opposite to each other on the support bar 203 (the first slide channel and the second slide channel are arranged in a direction perpendicular to a direction in which the second housing slides with respect to the first housing). The transition slide channel A13 is disposed on the side, going away from the first housing 100, of the mount housing 201, and two ends of the transition slide channel A13 are respectively communicated with the first slide channel A11 and the second slide channel A12. The surface, going away from the curved display portion 302, of the load-bearing strip 400 has a slider 401, and at least a portion of the slider is within the slide channel A1 of the second housing 200. In this case, by forming the first slide channel A11 and the second slide channel A12 that are oppositely disposed on the support bar 203 and arranging the transition slide channel A13, which is communicated with both the first slide channel A11 and the second slide channel A12, on the side, going away from the first housing 100, of the mount housing 201 (the side, going away from the first housing, of the mount housing is in the shape of circular arc, i.e., the slide channel is an arc-shaped slide channel), after the slider 401 of the side, going away from the curved display portion 302, of the load-bearing strip 400 is within the slide channel A1, the flexible display panel 300 is capable of driving the slider 401 in the load-bearing strip 400 to stably slide within the first slide channel A11, the transition slide channel A13, and the second slide channel A12. In the present disclosure, in the case that the second housing 200 slides along the direction away from the first housing 100, a majority of the load-bearing strips 400 that are fixedly connected to the curved display portion 302 of the flexible display panel 300 are within the first slide channel A11. In the case that the second housing 200 slides along the direction facing towards the first housing 100, a majority of the load-bearing strips 400 that are fixedly connected to the curved display portion 302 of the flexible display panel 300 are within the second slide channel A12. In the present disclosure, during the process that the second housing 200 in the display device slides relative to the first housing 100, in the direction in which the second housing 200 slides relative to the first housing 100, a portion of the plurality of load-bearing strips 400 in the display device are always in contact with the side, going away from the first housing 100, of the mount housing 201, and a portion of the plurality of sliders 401 are always within and slidably connected to the transition slide channel A13, wherein each of the sliders is disposed on the side, going away from the curved display portion 301, of the load-bearing strip 400. In this way, in the case that the second portion 3022 of the curved display portion 302 of the flexible display panel 300 is wrapped on the side, going away from the first housing 100, of the mount housing 201 and slides, the partial load-bearing strips always provide effective support for the curved display portion 302 being wrapped on the side, going away from the first housing 100, of the mount housing 201, such that the curved display portion 302 is prevented from having undesirable phenomena such as a large degree of warping during the sliding and rolling process, and thus the overall flatness of the flexible display panel 300 is ensured to be good, and the display effect of the display device is ensured to be good.

In some embodiments, as illustrated in FIG. 7, the plurality of load-bearing strips 400 in the display device are equally spaced on the back side of the curved display portion 302 of the flexible display panel 300. In this case, by distributing the plurality of load-bearing strips 400 equally spaced on the back side of the curved display portion 302 of the flexible display panel 300, the plurality of load-bearing strips apply uniform supporting forces to the curved display portion 302 of the flexible display panel 300, such that the flexible display panel 300 is well supported. In some embodiments, each of the plurality of load-bearing strips has the same width.

FIG. 9 is a schematic exploded view of a partial structure of the display device illustrated in FIG. 6. FIG. 10 is a schematic view of a connection between a stopper slot and a load-bearing strip illustrated in FIG. 9. In some embodiments of the present disclosure, referring to FIG. 6, FIG. 9, and FIG. 10, a stopper slot A2 is defined in the second housing 200. The stopper slot includes a first stopper slot A21 communicated with the first slide channel A11, a second stopper slot A22 communicated with the second slide channel A12, and a transition stopper slot A23 communicated with the transition slide channel A13. Both the first stopper slot A21 and the second stopper slot A22 are between the first slide channel A11 and the second slide channel A12, and the transition stopper slot A23 is closer to the first housing 100 relative to the transition slide channel A13. The surface, going away from the curved display portion 302, of the load-bearing strip 400 further includes a stopper protrusion 402 fixedly connected to the slider 401, and at least a portion of the stopper protrusion 402 is within the stopper slot A2. In this case, by forming the first stopper slot A21 and the second stopper slot A22 opposite to each other on the support bar 203 and forming the transition stopper slot A23 communicated with the first stopper slot A21 and the second stopper slot A22 on the mount housing 201, after the stopper protrusion 402 on the load-bearing strip 400 is within the stopper slot A2, the stopper protrusion 402 on the load-bearing strip 400 is driven by the flexible display panel 300 to slide stably within the first stopper slot A21, the transition stopper slot A23 and the second stopper slot A22. Moreover, the stopper slot A2 plays a good role in stopping the stopper protrusion 402. Even if the flexible display panel 300 tends to warp in the process of sliding and rolling, the flexible display panel 300 is still fixed by the coordination of the stopper slot A2 and the stopper protrusion 402.

In some embodiments, as illustrated in FIG. 10, the stopper slot A2 in the second housing 200 includes a first slot body a1 communicated with the slide channel A1, and two second slot bodies a2 disposed on both sides of the first slot body a1. Two stopper protrusion 402 are fixedly connected to the slider 401. A portion of the slider 401 is within the first slot body a1 after passing through the slide channel A1, and the two stopper protrusions 402 fixedly connected to the slider 401 are respectively within the two second slot bodies a2. In the case that the stopper slot A2 includes the first slot body a1 communicated with the slide channel A1 and two second slot bodies a2 disposed on both sides of the first slot body a1, and the two stopper protrusions 402 are respectively within the two second slot bodies a2, the stopping effect of the stopper slot A2 on the stopper protrusion 402 is further ensured. It should be noted that in some embodiments, each of the first stopper slot A21, the second stopper slot A22, and the transition stopper slot A23 in the stopper slot A2 has the first slot body a1 and the second slot body a2.

In some embodiments of the present disclosure, there are a variety of optional implementations for the structures of the mount housing 201 of the second housing 200, and the present disclosure gives the schematic description using the following two optional examples.

In a first optional example, as illustrated in FIG. 6 and FIG. 9, the mount housing 201 in the second housing 200 includes at least two sub-housings 2011 successively arranged, and a lock assembly 2012 between adjacent two sub-housings 2011 of the at least two sub-housings 2011. The lock assembly 2012 is connected to adjacent two sub-housings 2011. The support bar 203 is between adjacent two sub-housings 2011. The support bar 203 includes two sub-bars 2031, and one end of each of the two sub-bars 2031 is fixedly connected to one of the adjacent two sub-housings 2011. A portion of the slide channel A1 and a portion of the stopper slot A2 are both between the two sub-bars 2031, and another portion of the slide channel A1 and another portion of the stopper slot A2 are both between the adjacent two sub-housings 2011. In this case, the mount housing 201 includes a plurality of sub-housings 2011, adjacent two sub-housings are connected by the lock assembly 2012, the support bar 203 is between the adjacent two sub-housings 2011, one end of each of the two sub-bars 2011 of the support bar 203 is connected to one of the adjacent two sub-housings 2011, a portion of the slide channel A1 and a portion of the stopper slot A2 are both between the two sub-bars 2031, and another portion of the slide channel A1 and another portion of the stopper slot A2 are both between the adjacent two sub-housings 2011. Therefore, in the actual processing, it is convenient to form the slide channel A1 and the stopper slot A2 on the support bar 203 and the mount housing 201, such that the manufacturing process is simplified. Moreover, adjacent two sub-housings 2011 are secured by the lock assembly 2012, such that a complete second housing 200 is formed. In the present application, every adjacent two sub-housings 2011 correspond to one support bar 203. That is, every adjacent two sub-housings 2011 correspond to two sub-bars 2031. Therefore, one sub-housing 2011 and the corresponding sub-bar 2031 are integrally formed. In some embodiments, three sub-housings 2011 are provided in the mount housing 201, and every adjacent two sub-housings of the three sub-housings 2011 correspond to one support bar 203.

FIG. 11 is a schematic exploded view of a lock assembly and a sub-housing according to some embodiments of the present disclosure. In some embodiments, referring to FIG. 9 and FIG. 11, the lock assembly 2012 between adjacent two sub-housings 2011 includes a stop block C1, a location post C2, and a location hole C3. The stop block C1 is fixedly connected to a side, proximal to the second sub-housing B2, of the first sub-housing B1. The location post C2 is fixedly connected a portion of a side, going away from the first sub-housing B1, of the stop block C1. The location hole C3 is disposed on a side, proximal to the first sub-housing B1, of the second sub-housing B2. In the case that the location post C2 on the first sub-housing B1 is within the location hole C3 on the second sub-housing B2, the first sub-housing B1 is tightly connected to the second sub-housing B2, and the side, proximal to the first sub-housing B1, of the second sub-housing B2 abuts the other portion of the side, going away from the first sub-housing B1, of the stopper C1. The first sub-housing B1 and the second sub-housing B2 are adjacent two sub-housings of the at least two sub-housings 2011. In this case, the stop block C1 in the lock assembly 2012 is fixed to the side, proximal to the second sub-housing B2, of the first sub-housing B1, the location post C2 is fixedly connected to the stop block C1, and the location hole C3 in the lock assembly 2012 is disposed on the side, proximal to the first sub-housing B1, of the second sub-housing B2. In this way, the connection between the first sub-housing B1 and the second sub-housing B2 is achieved by the snap-fit cooperation between the location post C2 and the location hole C3. Alternatively, the stop block C1 abuts the side, proximal to the first sub-housing B1, of the second sub-housing B2, such that a sliding space for the slider 401 and the stopper protrusion 402 of the load-bearing strip 400 is formed. In the present disclosure, for the better connection stability of the adjacent two sub-housings 2011, a first threaded hole a3 is formed in the location post C2, a second threaded hole a4 communicated with the first threaded hole a3 is formed in the second sub-housing B2, and the lock assembly 2012 also includes a screw (not illustrated in the figures) that is tightly connected to the first threaded hole a3 and the second threaded hole a4.

In some embodiments of the present disclosure, as illustrated in FIG. 11, in adjacent two sub-housings 2011, a first recess D1 is defined in a side, proximal to the other sub-housing, of one of the sub-housings. The stop block C1 of the lock assembly 2012 is fixedly connected to a bottom surface of the first recess D1 of the first sub-housing B1, and the location hole C3 of the lock assembly 2012 is disposed on the bottom surface of the first recess D1 of the second sub-housing B2. A second recess D2 communicated with the first recess D1 is defined in the sub-bar 2031 of the support bar 203. In this case, by forming the first recess D1 on one side, proximal to the other sub-housing, of one of the adjacent two sub-housings 2011 (i.e., each of the adjacent two sub-housings has the first recess, with the two first recesses being provided opposite to each other), the two first recesses D1 form the transition stopper slot A23 in the mount housing 201. In addition, a second recess D2 communicated with the first recess D1 is formed in the sub-bar 2031 of the support bar 203, and two second recesses D2 of the two sub-bars 2031 of the support bar 203 are opposite to each other. The two second recesses D2 form the first stopper slot A21 and the second stopper slot A22 in the support bar 203.

In a second optional example, reference is made to FIG. 12 and FIG. 13. FIG. 12 is a schematic view of a partial structure of yet another display device according to some embodiments of the present disclosure. FIG. 13 is a schematic exploded view of a partial structure of the display device illustrated in FIG. 12. The mount housing 201 in the second housing 200 includes a mount housing body 2013 and at least two fix members 2014. The mount housing body 2013 and the support bar 203 are of a one-piece structure.

Adjacent two fix members of the at least two fix members 2014 correspond to one of the support bars 203, and adjacent two fix members 2014 are connected to a side, going away from the corresponding support bar 203, of the mount housing body 2013. Both the transition slide channel A13 and the transition stopper slot A23 are between the adjacent two fix members 2014. In this case, the mount housing 201 includes the mount housing body 2013 and two fix members 2014, and the mount housing body 2013 is a one-piece structure with the support bar 203. In this way, during the actual processing, a slot body of the transition stopper slot A23 is opened in each of the two fix members 2014, and after the two fix members 2014 are mounted to the side, going away from the corresponding support bar 203, of the mount housing body 2013, the transition slide channel A13 and the transition stopper slot A23 are formed between the two fix members 2014. Therefore, the manufacturing process of the transition stopper slot A23 and the transition slide channel A13 in the mount housing 201 is effectively simplified.

In some embodiments, as illustrated in FIG. 13, a location slot b1 is defined in a side, proximal to the mount housing body 2013, of the fix member 2014 of the mount housing 201, and an avoidance notch b2 is defined in the mount housing body 2013. The fix member 2014 is socketed on the mount housing body 2013 at the avoidance notch b2 on the mount housing body 2013 through the location slot b1. In the present disclosure, a side, going away from the mount housing body 2013, of the fix member 2014 is in a shape of a circular arc, and a side, going away from the first housing 100, of the mount housing body 2013 is also in a shape of circular arc. After the fix member 2014 is socketed on the mount housing body 2013 at the avoidance notch b2 on the mount housing body 2013 through the location slot b1, a surface, going away from the mount housing body 2013, of the fix member 2014 and a surface, going away from the first housing 100, of the mount housing body 2013 are coplanar, such that that the curved display portion 302 is ensured to slide smoothly.

FIG. 14 is a schematic view of a partial structure of yet still another display device according to some embodiments of the present disclosure. FIG. 15 is a schematic structural view of a fix plate according to some embodiments of the present disclosure. In some embodiments, referring to FIG. 14, and FIG. 15, the flexible display panel 300 in the display device further includes a non-display portion 303 disposed on a side, going away from the planar display portion 301, of the curved display portion 302. The display device further includes a fix plate 500, which is fixedly connected to a back side of the non-display portion 303, and both ends of the fix plate 500 are respectively slidably connected to the two stoppers 202. A surface, going away from the non-display portion 303, of the fix plate 500 has an auxiliary slider 501, and at least a portion of the auxiliary slider 501 is within the slide channel A1 of the mount housing 201. In this case, the non-display portion 303 in the flexible display panel 300 is fixedly connected to the fix plate 500, the two ends of the fix plate 500 are respectively slidably connected to the two stoppers 202, and the auxiliary slider 501 on the surface, going away from the non-display portion 303, of the fix plate 500 is within the slide channel A1. In this way, during the sliding and rolling process of the flexible display panel 300, the undesirable phenomenon of warping of the non-display portion 303 of the flexible display panel 300 is effectively avoided, and the non-display portion 303 of the flexible display panel 300 is made not to collide with other structures, such that the reliability of the display device is good.

In some embodiments, the auxiliary slider 501 on the surface, going away from the non-display portion 303, of the fix plate 500 is slidably connected to the second slide channel A12.

In some embodiments, as illustrated in FIG. 14, the display device further includes a recovery plate 600 fixedly connected to a side, going away from the load-bearing strip 400, of the fix plate 500, a circuit board 700 fixed to the recovery plate 600, and a chip on flex (COF) configured to connect the circuit board 700 to the non-display portion 303. In this case, the recovery plate 600 fixedly connected to one end of the fix plate 500 (a lengthwise direction of the recovery plate and a lengthwise direction of the fix plate are consistent) is provided, both ends of the COF 800 are respectively connected to the circuit board 700 and the non-display portion 303 in the flexible display panel 300, and the circuit board 700 in the display device is fixed to the recovery plate 600. In this way, the circuit board 700 and the COF 800 are well supported by the recovery plate 600, such that during the process of sliding and rolling of the flexible display panel 300, the circuit board 700 and the COF 800 are prevented from the undesirable phenomenon of falling.

FIG. 16 is a schematic exploded view of a load-bearing strip, a flexible display panel, and a stopper according to some embodiments of the present disclosure. In some embodiments of the present disclosure, referring to FIG. 16, an auxiliary slide channel E1 is defined in a side, facing towards the load-bearing strip 400, of the stopper 202 of the second housing 200, and an end portion of the load-bearing strip 400 is within the auxiliary slide channel E1 and slidably connected to the auxiliary slide channel E1. In the present disclosure, the auxiliary slide channel E1 of each of the stoppers 202 includes a first planar slide channel E11 and a second planar slide channel E12 that are opposite to each other, and a curved surface slide channel E13 communicated with both the first planar slide channel E11 and the second planar slide channel E12. The curved surface slide channel E13 is disposed on a side, going away from the first housing 100, of the stopper 202. In this case, by setting the auxiliary slide channel E1 of the stopper 202 to include the first planar slide channel E11, the second planar slide channel E12 opposite to each other, and the curved surface slide channel E13 between the two planar slide channels, the end portions of the plurality of load-bearing strips 400 connected to the back side of the curved display portion 302 of the flexible display panel 300 are capable of stably sliding within the first planar slide channel E11, the second planar slide channel E12, and the curved surface slide channel E13. In some embodiments, the end portion of the load-bearing strip 400 includes a first sliding protrusion e1, and at least a portion of the first sliding protrusion e1 is within the auxiliary slide channels E1. An end portion of the fix plate 500 includes a second sliding protrusion e2, and at least a portion of the second sliding protrusion e2 is within the auxiliary slide channel E1 (at least a portion of the second sliding protrusion is within the second planar slide channel of the auxiliary slide channel).

FIG. 17 is a schematic view of a partial structure of a display device according to other embodiments of the present disclosure. In some embodiments, referring to FIG. 17, the display device further includes a drive assembly 900, which is connected to the first housing 100 and the second housing 200. The drive assembly 900 is configured to drive the second housing 200 to slide relative to the first housing 100. In this case, by providing the drive assembly 900 in the display device, the drive assembly 900 is capable of driving the relative sliding between the first housing 100 and the second housing 200, such that the user experience is effectively improved. In the present disclosure, the display device further includes a control assembly (not illustrated in FIG. 17). The control assembly is connected to the drive assembly, and the user controls the drive assembly to drive the relative sliding between the first housing 100 and the second housing 200 by the control assembly.

In some embodiments, as illustrated in FIG. 17, the drive assembly 900 in the display device includes a drive motor 901, a transmission shaft 902, and a transmission member 903. The drive motor 901 is secured to the first housing 100 and connected to one end of the transmission shaft 902. The transmission member 903 is socketed on the transmission shaft 902 and connected to the second housing 200. The drive motor 901 in the drive assembly 900 is configured such that, when driving the transmission shaft 902 to rotate, the transmission member 903 is moved along a lengthwise direction of the transmission shaft 902 (the lengthwise direction of the transmission shaft is parallel to the sliding direction of the second housing relative to the first housing) to drive the second housing 200 to slide relative to the first housing 100. In some embodiments, the transmission shaft 902 in the drive assembly 900 is a screw f1, and the transmission member 903 includes a nut f2 socketed on the screw f1, and a stressed bar f3 connected to the nut f2 and the second housing 200. In this case, the drive motor 901 drives the screw f1 to rotate when operating, and the screw f1 is capable of driving the nut f2 to slide along a lengthwise direction of the screw f1 when rotating, and thus the second housing is driven by the stressed bar 903 to slide relative to the first housing 100. In some embodiments, in the case that the drive motor 901 drives the screw f1 to rotate along a clockwise direction, the transmission member 903 drives the second housing 200 to slide along a direction away from the first housing 100; and in the case that the drive motor drives the screw 702 to rotate along a counterclockwise direction, the transmission member 903 drives the second housing 200 to slide along a direction facing towards the first housing 100. It should be noted that in other embodiments, the second housing 200 is driven by other drive assemblies to slide relative to the first housing 100, which is not limited herein. In addition, in the case that the number of second housings is two, the two second housings 200 are driven to slide relative to the first housing 100 by two drive assemblies 900 respectively.

In some embodiments, as illustrated in FIG. 17, the display device further includes a fix guide rail 1000 and a drive slider 1100. The fix guide rail 1000 is fixed to the first housing 100, and a lengthwise direction of the fix guide rail 1000 is parallel to the sliding direction of the second housing 200 relative to the first housing 100. The drive slider 1100 is fixedly connected to the second housing 200 and socketed on and slidably connected to the fix guide rail 1000 and slidably connected to the fix guide rail 1000. In this case, the fix guide rail 1000 and the drive slider 1100 cooperate with each other, the fix guide rail 1000 is disposed on the first housing 100, and the drive slider 1100 is disposed on the second housing 200. In this way, during the process that the second housing 200 slides relative to the first housing 100, the drive slider 1100 also slides relative to the fix guide rail 1000, such that the sliding direction of the second housing 200 relative to the first housing 100 is limited by the sliding direction of the drive slider 1100 relative to the fix guide rail 1000. That is, it is ensured that there is no undesirable phenomenon of offsetting during the process that the second housing 200 slides relative to the first housing 100.

FIG. 18 is a schematic structural view of another display device according to other embodiments of the present disclosure. FIG. 19 is a schematic exploded view of a guiding bar and a guiding slide channel in the display device illustrated in FIG. 18. In some embodiments of the present disclosure, referring to FIG. 18 and FIG. 19, the second housing 200 in the display device includes a plurality of guiding bars 204 arranged in parallel. A lengthwise direction of each of the guiding bars 204 is parallel to the lengthwise direction of the support bar 203. In addition, the first housing 100 includes a plurality of guiding slide channels 101 in one-to-one correspondence to the plurality of guiding bars 204. At least a portion of the guiding bar 204 is within the corresponding guiding slide channel 101 and slidably connected to this corresponding guiding slide channel 101. In this case, through the one-to-one cooperation of the plurality of guiding bars 204 and the plurality of guiding slide channels 101, the flexible display panel 300 is well supported at the same time that the second housing 200 is further ensured to slide stably relative to the first housing 100. In the present disclosure, as illustrated in FIG. 18 and FIG. 19, the guiding slide channel 101 of the first housing 100 is a dovetail slot, and the guiding bar 204 of the second housing 200 includes a guiding bar body 2041 and a guiding slider 2042 that is fixedly connected to an end of the guiding bar body 2041. One end of the guiding bar body 2041 is fixedly connected to the guiding slider 2042, and the other end is fixedly connected to a side edge in the mount housing 201 for fixing the support bar 203. The shape of the guiding slider 2042 is matched with the shape of the dovetail slot, and at least a portion of the guiding slider 2042 is within the dovetail slot. In this case, by defining the guiding slide channel 101 to be the dovetail slot and the shape of the guiding slider 2042 in the guiding bar 204 to be matched with the shape of the dovetail slot, in the process that the guiding bar 204 slides relative to the guiding slide channel 101, the guiding bar 204 is prevented from disengaging from the guiding slide channel 101, such that the user experience of the display device is good. In some embodiments, referring to FIG. 20, which is a schematic structural view of a dovetail slot according to some embodiments of the present disclosure, the dovetail slot includes a first slot F1 and a second slot F2 that are communicated with each other, wherein a width of the first slot F1 is greater than a width of the second slot F2.

In summary, some embodiments of the present application provide a display device. The display device includes the first housing, at least one second housing, the flexible display panel, and the plurality of load-bearing strips. The plurality of load-bearing strips are disposed on the back side of the curved display portion in the flexible display panel (the plurality of load-bearing strips are arranged in an array along the sliding-rolling direction of the curved display portion), and the both ends of each of the load-bearing strips are respectively slidably connected to the two stoppers in the second housing. The surface, going away from the curved display portion, of the load-bearing strip is in contact with the support bar between the two stoppers in the second housing. In this way, the flexible display panel is effectively supported by the plurality of load-bearing strips, and the degree of freedom of the flexible display panel in the direction perpendicular to the display surface of the display panel is limited by the cooperation of the load-bearing strips with the stoppers and the support bars in the second housing, such that the probability of the undesirable phenomenon of unevenness occurring to the overall region of the flexible display panel is effectively reduced. That is, the overall flatness of the flexible display panel is good (after the flexible display panel is stretched, the overall flatness of the flexible display panel is ensured to be good by the supporting effect of the support bar on the plurality of load-bearing strips), such that the display effect of the display device is good.

It should be noted that in the accompanying drawings, the sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Like reference numerals indicate like elements throughout.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display device, comprising:

a first housing and at least one second housing, wherein the second housing is slidably connected to the first housing, and the second housing comprises a mount housing, two stoppers fixedly connected to two ends of the mount housing, and at least one support bar between the two stoppers, one end of the support bar being fixedly connected to the mount housing;

a flexible display panel, comprising a planar display portion and a curved display portion, wherein the planar display portion is fixed to the first housing, and the curved display portion comprises a first portion parallel to the planar display portion and a second portion between the first portion and the planar display portion, the second portion being wrapped on a side, going away from the first housing, of the mount housing; and a plurality of load-bearing strips arranged in an array between the two stoppers, wherein two ends of each of the load-bearing strips are respectively slidably connected to the two stoppers, each of the load-bearing strips is fixedly connected to a back side of the curved display portion, a lengthwise direction of each of the load-bearing strips is intersected with a lengthwise direction of the support bar, and a surface, going away from the curved display portion, of the load-bearing strip is in contact with the support bar;

wherein a slide channel is defined in the second housing, wherein the slide channel comprises a first slide channel and a second slide channel that are opposite to each other on the support bar, and a transition slide channel disposed on the side, going away from the first housing, of the mount housing, two ends of the transition slide channel being respectively communicated with the first slide channel and the second slide channel; and the surface, going away from the curved display portion, of the load-bearing strip comprises a slider, wherein at least a portion of the slider is within the slide channel;

a stopper slot is defined in the second housing, wherein the stopper slot comprises a first stopper slot communicated with the first slide channel, a second stopper slot communicated with the second slide channel, and a transition stopper slot communicated with the transition slide channel, the first stopper slot and the second stopper slot both being between the first slide channel and the second slide channel, and the transition stopper slot being closer to the first housing relative to the transition slide channel; and the surface, going away from the curved display portion, of the load-bearing strip further comprises a stopper protrusion fixedly connected to the slider, wherein at least a portion of the stopper protrusion is within the stopper slot;

the mount housing comprises at least two sub-housings successively arranged, and a lock assembly between adjacent two of the sub-housings, the lock assembly being connected to each of the adjacent two sub-housings; and the support bar is between adjacent two of the sub-housings, and the support bar comprises two sub-bars, one end of each of the two sub-bars being fixedly connected to one of the adjacent two sub-housings;

wherein a portion of the slide channel and a portion of the stopper slot are between the two sub-bars, and another portion of the slide channel and another portion of the stopper slot are between the adjacent two sub-housings.

2. The display device according to claim 1, wherein the stopper slot comprises a first slot body communicated with the slide channel, and two second slot bodies disposed on both sides of the first slot body;

wherein the number of the stopper protrusions fixedly connected to the slider is two, a portion of the slider is within the first slot body after passing through the slide channel, and the two stopper protrusions are respectively within the two second slot bodies.

3. The display device according to claim 1, wherein the lock assembly comprises a stop block fixedly connected to a side, proximal to the second sub-housing, of the first sub-housing, a location post fixedly connected to a side, going away from the first sub-housing, of the stop block, and a location hole disposed on a side, proximal to the first sub-housing, the second sub-housing; wherein after the location post is within the location hole, the first sub-housing is connected to the second sub-housing, and the side, proximal to the first sub-housing, of the second sub-housing abuts the stop block; and the first sub-housing and the second sub-housing are respectively adjacent two sub-housings of the at least two sub-housings.

4. The display device according to claim 3, wherein in adjacent two of the sub-housings, a first recess is defined in a side, adjacent to the other sub-housing, of one of the two sub-housings, the stop block is fixedly connected to a bottom surface of the first recess in the first sub-housing, and the location hole is disposed on a bottom surface of the first recess in the second sub-housing; and a second recess communicated with the first recess is defined in the sub-bar.

5. The display device according to claim 1, wherein the flexible display panel further comprises a non-display portion disposed on a side, going away from the planar display portion, of the curved display portion; and the display device further comprises a fix plate, wherein the fix plate is fixedly connected to a back side of the non-display portion, two ends of the fix plate are respectively slidably connected to the two stoppers, and a surface, going away from the non-display portion, of the fix plate comprises an auxiliary slider, at least a portion of the auxiliary slider being within the slide channel.

6. The display device according to claim 5, further comprising: a recovery plate fixedly connected to a side, going away from the load-bearing strip, of the fix plate, a circuit board fixed to the recovery plate, and a chip on flex (COF) configured to connect the circuit board to the non-display portion.

7. The display device according to claim 1, wherein an auxiliary slide channel is defined in a side, facing towards the load-bearing strip, of the two stoppers, and an end portion of the load-bearing strip is within the auxiliary slide channel.

8. The display device according to claim 1, wherein the side, going away from the first housing, of the mount housing is in a shape of a circular arc.

9. The display device according to claim 1, further comprising: a drive assembly, wherein the drive assembly is connected to the first housing and the second housing, and the drive assembly is configured to drive the second housing to slide relative to the first housing.

10. The display device according to claim 1, wherein the number of the second housings in the display device is one, and after the flexible display panel is stretched, the second housing is disposed on any one of the opposite two sides of the first housing; or the number of the second housings in the display device is two, and after the flexible display panel is stretched, the two second housings are respectively disposed on the opposite two sides of the first housing.

11. A display device, comprising:

a first housing and at least one second housing, wherein the second housing is slidably connected to the first housing, and the second housing comprises a mount housing, two stoppers fixedly connected to two ends of the mount housing, and at least one support bar between the two stoppers, one end of the support bar being fixedly connected to the mount housing;

a flexible display panel, comprising a planar display portion and a curved display portion, wherein the planar display portion is fixed to the first housing, and the curved display portion comprises a first portion parallel to the planar display portion and a second portion between the first portion and the planar display portion, the second portion being wrapped on a side, going away from the first housing, of the mount housing; and a plurality of load-bearing strips arranged in an array between the two stoppers wherein two ends of each of the load-bearing strips are respectively slidably connected to the two stoppers, each of the load-bearing strips is fixedly connected to a back side of the curved display portion, a lengthwise direction of each of the load-bearing strips is intersected with a lengthwise direction of the support bar, and a surface, going away from the curved display portion, of the load-bearing strip is in contact with the support bar; wherein a slide channel is defined in the second housing, wherein the slide channel comprises a first slide channel and a second slide channel that are opposite to each other on the support bar, and a transition slide channel disposed on the side, going away from the first housing, of the mount housing, two ends of the transition slide channel being respectively communicated with the first slide channel and the second slide channel; and the surface, going away from the curved display portion, of the load-bearing strip comprises a slider, wherein at least a portion of the slider is within the slide channel;

a stopper slot is defined in the second housing, wherein the stopper slot comprises a first stopper slot communicated with the first slide channel, a second stopper slot communicated with the second slide channel, and a transition stopper slot communicated with the transition slide channel, the first stopper slot and the second stopper slot both being between the first slide channel and the second slide channel, and the transition stopper slot being closer to the first housing relative to the transition slide channel; and the surface, going away from the curved display portion, of the load-bearing strip further comprises a stopper protrusion fixedly connected to the slider, wherein at least a portion of the stopper protrusion is within the stopper slot;

the mount housing comprises a mount housing body and at least two fix members, wherein the mount housing body and the support bar are of a one-piece structure, adjacent two fix members of the at least two fix members correspond to one of the support bars, and the adjacent two fix members are connected to a side, going away from the corresponding support bar, of the mount housing body;

wherein the transition slide channel and the transition stopper slot are both between the adjacent two fix members.

12. The display device according to claim 11, wherein a location slot is defined in a side, proximal to the mount housing body, of the fix member, an avoidance notch is defined in the mount housing body, and the fix member is socketed on the mount housing body at the avoidance notch through the location slot.

* * * * *